Figures 1, 2:
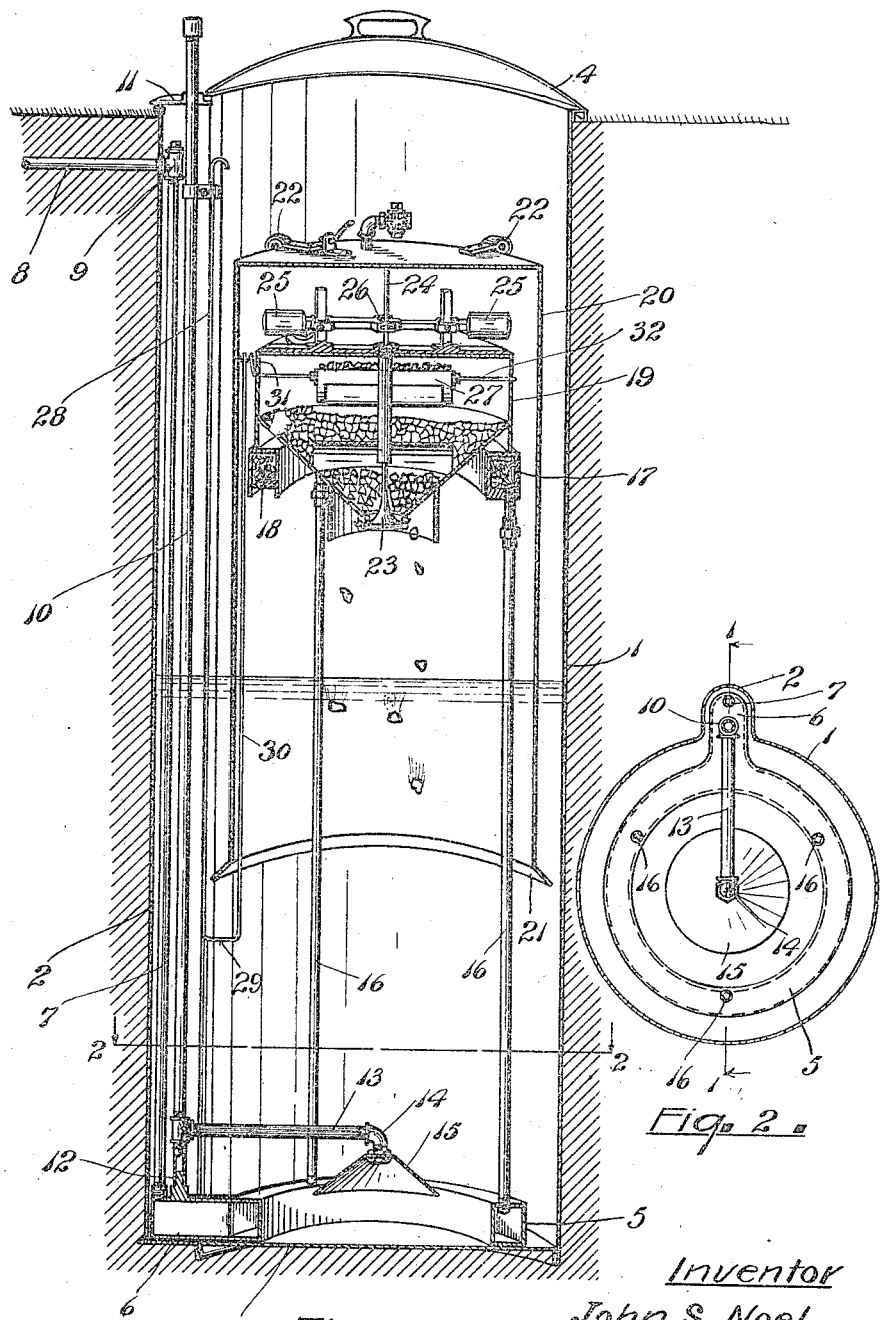

J. S. NOEL.
ACETYLENE GENERATOR.
APPLICATION FILED OCT. 27, 1917.

1,282,919.

Patented Oct. 29, 1918.

Inventor
John S. Noel
By Moulton & Lurrance
Attorneys.

UNITED STATES PATENT OFFICE.

JOHN S. NOEL, OF GRAND RAPIDS, MICHIGAN.

ACETYLENE-GENERATOR.

1,282,919. Specification of Letters Patent. Patented Oct. 29, 1918.

Application filed October 27, 1917. Serial No. 198,800.

*To all whom it may concern:*

Be it known that I, JOHN S. NOEL, a citizen of the United States of America, residing at Grand Rapids, in the county of Kent and State of Michigan, have invented certain new and useful Improvements in Acetylene-Generators; and I do hereby declare the following to be a full, clear, and exact description of the invention, such as will enable others skilled in the art to which it appertains to make and use the same.

This invention relates to acetylene plants and is concerned particularly with acetylene gas generators. It is an object and purpose of the present invention to inclose all of the generator mechanism within a tank which, likewise, holds the water into which the carbid is dropped for generation of the gas, it being possible with such construction to remove the entire mechanism of the generator from the tank if at any time it is desirable for over-hauling or repairing, this also being of value as an insurance against the leakage of water from the tank. A further object of the invention consists in a novel means for removing the sediment precipitated from the carbid which, in practice, falls to the bottom of the tank and is covered by the water therein, my invention including devices by means of which the sediment may be pumped out with removal of but comparatively little of the water within the tank. This, it is evident, is a matter of considerable importance as the replacement of water within the tank by a new supply requires that the same be charged with gas before any will escape therefrom above and into the gas-containing bell of the generator. These features, together with many others not specifically noted at this point, but which will appear fully and in detail as the description progresses, are incorporated in my invention shown in the accompanying drawing, in which, Figure 1 is a perspective and central sectional view through an acetylene generator, the section being taken substantially on the line 1—1 of Fig. 2.

Fig. 2 is a horizontal section on the line 2—2 of Fig. 1.

Like reference characters refer to like parts in the different views of the drawing.

In construction, a large cylindrical tank 1, made from sheet metal, is provided, which at one side is formed with an off-set portion 2 extending the full height of the tank. The tank has a bottom 3 which is secured in place in any suitable manner so as to be proof against leakage. The upper end of the tank is normally closed by a removable cover 4. This tank is adapted to be installed by placing the same in the ground as shown.

Within the tank and resting upon the bottom 3, a hollow ring-like casting 5 is located, from one side of which an integral hollow off-set portion 6 projects, the same entering the off-set portion 2 of the tank previously described. A supply pipe 7 threads into said part 6 and is located vertically within the part 2 of the tank, extending nearly the full length thereof and connecting with an outlet pipe 8 which passes through a side of the tank, the connection being effected by a coupling 9. The outlet pipe 8 may lead to the lights or any other devices for consumption of the gas.

There is also located within the off-set portion 2 of the tank a second upright pipe 10 which at its upper end passes through a rigid cover plate 11 placed over the off-set part 2 of the tank. At its lower end this pipe is seated over a short upwardly projecting lug 12 cast on the part 6, while a branch pipe 13 leads from adjacent the lower end of the pipe 10 to a point substantially over the center of the bottom 3 of the tank, an elbow 14 at the end of the branch 13 connecting the same with a cone-like member 15 which is held a short distance above the bottom of the tank as shown. Normally the sediment deposited by the carbid drops within the ring 5, filling the space therein and covering the member 15. By attaching a pump to the upper end of the pipe 10 the sediment may be drawn in and under said member 15 and pumped out through the branch 13 and the pipe 10 whereby the major portion of the sediment may be removed with the removal of only a small part of the water.

A plurality of vertical tubes 16 thread into the ring 5 at their upper ends supporting a second ring 17 partially open on its under side and filled with a filtering material 18. The carbid receptacle 19 rests upon the upper ring 17 over which the gas bell 20 is placed, the same entering into the water and being flared outwardly at its lower end, as indicated at 21, whereby gas given off by the carbid is collected and directed into the bell as the carbid is dropped in and passed downwardly through the water. The bell on its top is equipped with outwardly projecting rollers 22 which bear against the inner sides of the tank 1. The carbid receptacle is of conventional construction including an outlet valve 23 connected with a rod 24 passing upwardly through the top of the carbid receptacle and adapted to be moved in a downward direction by the gas bell as it lowers to permit the escape of carbid when the gas goes below a certain point in the bell. The elevation of the rod 24 and attached valve is effected by two weights 25 attached at the ends of pivotally mounted levers which at their meeting ends have pin and slot connections as indicated at 26 with the rod 24. This permits a true vertical movement of the rod 24 without any bending of the same to one side as is true when one weight and lever only is used with a pivotal connection between the end of the weight lever and the rod. A reserve supply receptacle 27 is located within the carbid receptacle and may be dumped by pulling upwardly on a rod 28, the upper end of which is accessible from the upper portion of the tank 1. This rod extends downwardly along the outer side of the bell 20, being thence bent inwardly, as indicated at 29, under the lower edges of the bell, and then turned upwardly as at 30 to pass along the inner side of the bell, its upper end having connection to a crank 31 formed at the end of a rod 32 on which the reserve supply receptacle 27 is mounted.

The construction outlined is relatively simple and it is apparent that the entire mechanism may be very easily removed from the tank, merely disconnecting the outlet pipe 8 from the coupling 9. Furthermore, the only opening made through the side of the tank is above the water line so that there is no danger of leakage and at the same time no leak proof joint or packing is needed at the point where the outlet pipe 8 passes through the tank. In addition, the sediment may be removed from the tank without at the same time wasting the charged water therein to any extent, and this pumping mechanism is also freely removed for any repairing which may be necessary. By making the flange 21, at the lower end of the gas bell, it is not necessary to make use of a separate and distinct mixing chamber as heretofore with devices of this character. All of these features make the generator one of practical utility the same being very easily assembled and installed or disassembled and repaired if it should at any later period become necessary.

I claim:

1. In an acetylene gas generator, a vertical tank having an outwardly extending portion at one side extending the full height of said tank, a hollow member located at the bottom of the tank including an offset portion at one side extending into said outwardly extending portion of the tank, an outlet pipe connected to said offset portion of the member and located within said outwardly extending portion of the tank, and means to conduct gas to said hollow member, substantially as described.

2. In an acetylene gas generator, a vertically positioned tank having an offset portion at one side extending the full height of the tank, a hollow ring located at the bottom of the tank, said ring having a hollow offset portion at one side extending into the offset portion of the tank, means to supply gas to the interior of said hollow ring, an outlet pipe positioned vertically within the offset portion of the tank and connected to the offset portion of the ring, a second pipe positioned vertically within said offset portion of the tank and extending above the tank, a lateral branch to said second tank and a sheet metal member having a concaved under side attached to the end of said branch and located substantially above the center of the bottom of said tank, substantially as described.

3. In an acetylene gas generator, a vertically positioned tank, a pipe located at one side of and within the tank, and extending to a point above the tank, a lateral branch to said pipe adjacent the lower end thereof, a member of sheet metal having downwardly and outwardly inclined sides connected to the end of the branch pipe and located a short distance above the bottom of the tank whereby sediment precipitated to the bottom of the tank may be withdrawn therefrom through said member and pipes, and a ring located immediately below and around the lower edges of said sheet metal member within which said sediment normally falls, substantially as described.

4. In an acetylene gas generator, a vertically positioned tank provided with a lateral offset portion extending the full height of the tank, a hollow ring located in the lower part of the tank and including a hollow laterally extending offset portion entering the offset portion of the tank, an outlet pipe located in the offset portion of the tank and connected with said offset portion of the ring, a plurality of vertical pipes connected to and extending above the ring, a second ring connected to the upper ends of said pipes, said second ring being hollow and having openings in a side thereof, a carbid receptacle supported on and above said second ring, and a gas bell passed freely over the carbid receptacle and second ring, and provided at its lower edges with an outwardly flared section which, at its outer edges, lies in close proximity to the inner sides of the tank substantially as and for the purpose described.

5. In an acetylene gas generator, a vertically positioned tank provided with a lateral offset portion extending the full height of the tank, a hollow ring located in the lower part of the tank and including a hollow laterally extending offset portion entering the offset portion of the tank, an outlet pipe located in offset portion of the tank and connected with said offset portion of the ring, a plurality of vertical pipes connected to and extending above the ring, a second ring connected to the upper ends of said pipes, said second ring being hollow and having openings in a side thereof, a carbid receptacle supported on and above said second ring, a gas bell passing freely over the carbid receptacle and second ring, and provided at its lower edges with an outwardly and downwardly flared section which, at its outer edges, lies in close proximity to the inner sides of the tank, an upwardly extending projection on the offset portion of the ring, a second pipe located within the offset portion of the tank and into the lower end of which the projection enters, a lateral branch pipe extending from said second pipe over the first ring, and a sheet metal member attached to the end of the branch pipe and positioned substantially centrally of and slightly above the first ring, said sheet metal member having a dished under side and the outer lower edges thereof coming slightly below the upper side of said first ring, substantially as described.

6. In an acetylene gas generator, a vertically positioned tank provided with a lateral offset portion extending the full height of the tank, a hollow ring located in the lower part of the tank and provided with a laterally extending offset portion extending into the offset portion of the tank, means to supply gas to the ring, an outlet pipe located in the offset portion of the tank and connected with said offset portion of the ring, an upwardly extending projection on the offset portion of the ring, a second pipe located within the offset portion of the tank and into the lower end of which said projection enters, a lateral branch pipe extending from said second pipe over the ring, and a dished sheet metal member attached to the end of the branch pipe and positioned substantially centrally of and slightly above said ring, said dished member being inverted and the outer lower edges thereof coming slightly below the upper side of said ring, substantially as described.

In testimony whereof I affix my signature.

JOHN S. NOEL.

Copies of this patent may be obtained for five cents each, by addressing the "Commissioner of Patents, Washington, D. C."